FIG. 1
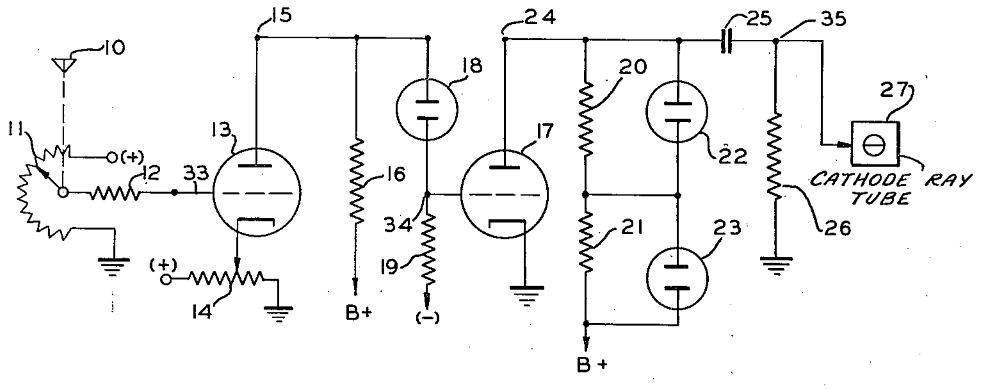
FIG. 2
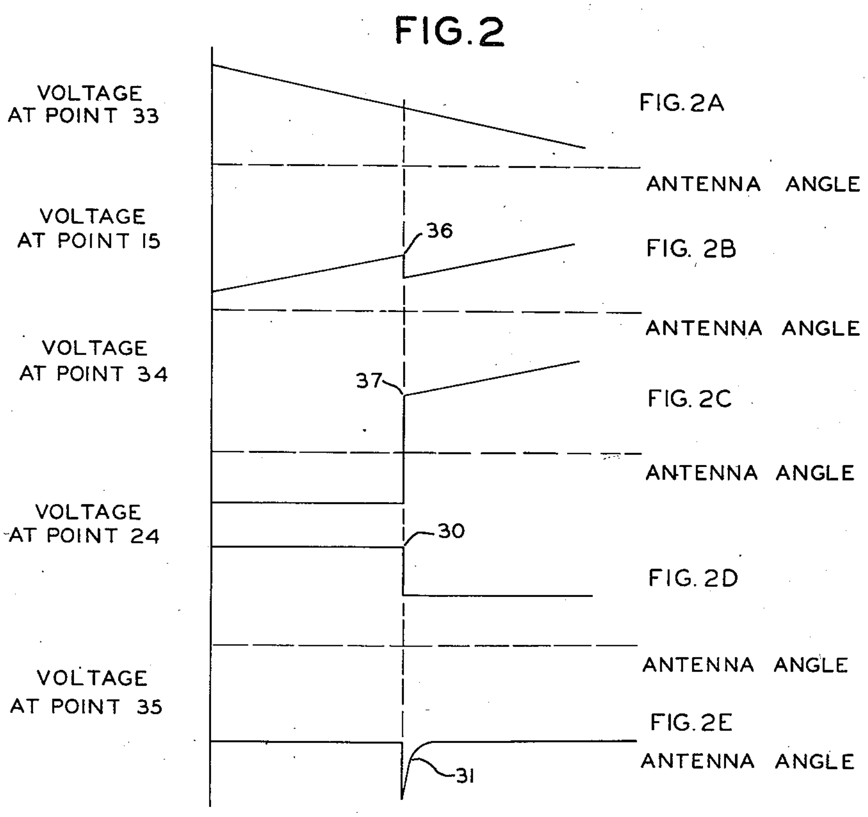
FIG. 2A FIG. 2B FIG. 2C FIG. 2D FIG. 2E
INVENTOR.
LAWRENCE H. JOHNSTON
BY William D. Hall
ATTORNEY Nov. 27, 1951 L. H. JOHNSTON 2,576,346
ELECTRICAL MARKER GENERATOR CIRCUIT
Filed July 9, 1945 2 SHEETS—SHEET 2
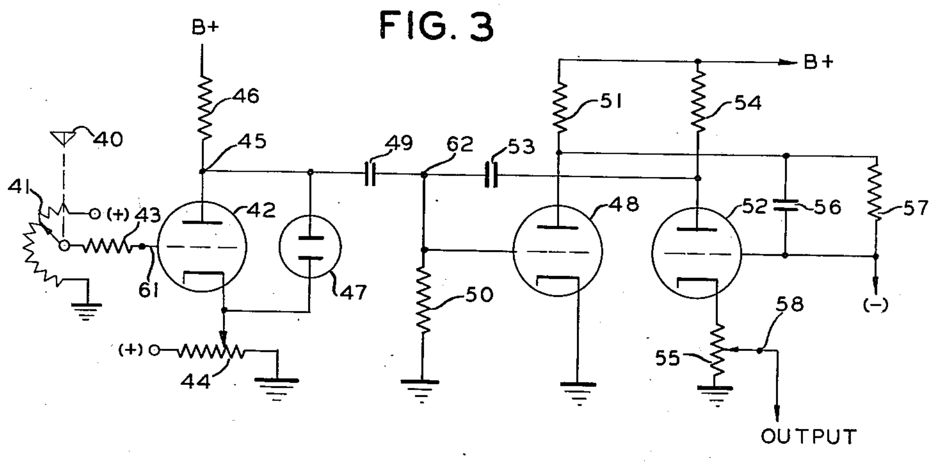
FIG. 3
FIG. 4
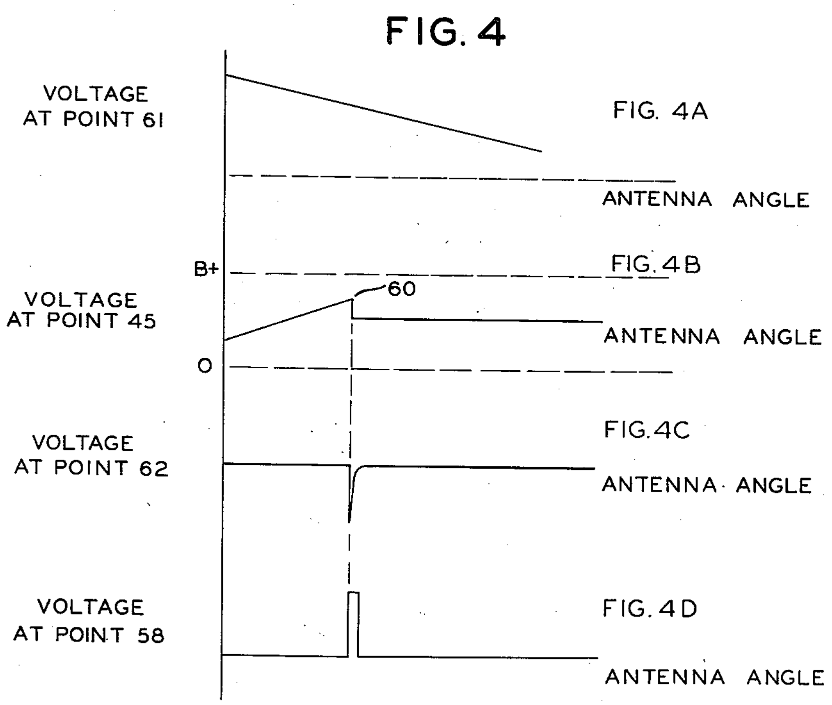
FIG. 4A, FIG. 4B, FIG. 4C, FIG. 4D
INVENTOR
LAWRENCE H. JOHNSTON
BY William D. Hall
ATTORNEY Patented Nov. 27, 1951 2,576,346

UNITED STATES PATENT OFFICE 2,576,346

ELECTRICAL MARKER GENERATOR CIRCUIT

Lawrence H. Johnston, Rural, N. Mex., assignor, by mesne assignments, to the United States of America as represented by the Secretary of War Application July 9, 1945, Serial No. 604,043

12 Claims. (Cl. 343—118)

This invention relates in general to control circuits and more particularly to control circuits which produce an output pulse at the time a predetermined voltage appears at the input thereof.

In some cases in a system in which a sweep voltage on a cathode ray tube is synchronized with the rotation of a directional antenna, it is desirable to have a reference line on the screen of the tube at a reference azimuth angle. Mechanical methods of placing this reference line on the screen result in parallax as a natural consequence. Thus an electronic marker system would be more accurate. Furthermore, if the cathode ray tube trace is not always exactly a straight line, an electronically-formed angle marker may assume essentially the same shape as the cathode ray tube trace, giving a curved line on the cathode ray tube which represents what is actually a straight line in space. This is impossible using a mechanical marker superimposing invariable reference lines on the the cathode ray tube.

Among the objects of my invention, therefore, are:

2. To provide a marker line to be used on the screen of a cathode ray tube.

2. To provide a marker that is formed electronically.

3. To provide a circuit for producing such a marker line. In accordance with the present invention, there are provided two adaptations of an angle-marker circuit for use with rotatable antennas A potentiometer whose output depends upon the angular position of an antenna controls the grid voltage of a control tube. A neon tube in the plate circuit of the tube fires at a critical voltage, which in one of the circuits feeds into a differentiating network which finally produces a negative pulse output with a sloping trailing edge. This pulse is applied to the cathode of a cathode ray tube to increase the brightness of the trace on the tube. In the other circuit, the output of the control stage is applied to a start-stop multivibrator which generates a positive rectangular pulse which is applied to the grid of a cathode ray tube.

This invention will best be understood by reference to the drawings, in which:

Figure 1 is a circuit diagram of one adaptation of the angle-marker circuit according to my invention;

Fig. 2 shows waveforms at various points in the circuit of Fig. 1; in which:

Figs. 2A, 2B, 2C, 2D and 2E are graphs of the variations of voltage at points 33, 15, 34, 24 and 35 respectively, with antenna angle.

Fig. 3 is a circuit diagram of a second adaptation of the angle-marker circuit according to my invention; and Fig. 4 shows waveforms at various points in the circuit of Fig. 3; in which:

Figs. 4A, 4B, 4C, and 4D are graphs of the variations of voltage at points 61, 45, 62 and 58 respectively, with antenna angle.

Referring now to the description of the first circuit and more particularly to Fig. 1, 10 is an antenna which is rotatable in azimuth and which is mechanically connected to potentiometer 11, which is connected between a positive voltage, as marked, and ground. The voltage on the movable arm of potentiometer 11 feeds through a large resistor 12 to the grid of tube 13. The cathode of tube 13 is held at a positive voltage by potentiometer 14, which is connected between a positive voltage, as noted, and ground. The plate of tube 13 is connected to B+ through load resistor 16. The plate of tube 13 is also connected to the grid of tube 17 through neon tube 18. The grid of tube 17 is also connected to a negative voltage, as marked, through resistor 19. The plate of tube 17 is connected to B+ through two series resistors, 20 and 21. Across resistor 20 is connected neon tube 22 and across resistor 21 is connected neon tube 23. The cathode of tube 17 is grounded. The plate of tube 17 is connected to ground through a series network consisting of condenser 25 and resistor 26. The voltage across resistor 26 is fed to the cathode of cathode ray tube 27.

Referring now to the description of the second circuit and to Fig. 3, antenna 40 is physically connected to the center arm of potentiometer 41, which is connected between a positive voltage, as noted, and ground. The center arm is connected to the grid of tube 42 through a large resistor 43. The cathode of tube 42 is held at a positive potential by connecting it to the center arm of potentiometer 44, which is connected between a positive voltage, as marked, and ground. The plate of tube 42 is connected to B+ through load resistor 46. In parallel with tube 42 is placed neon tube 47. The plate of tube 42 is connected to the grid of the normally conducting tube 48 of a start-stop multivibrator through condenser 49. The grid of this tube is connected to ground through resistor 50. The cathode of tube 48 is grounded and the plate is fed from B+ through resistor 51. The grid of tube 48 is coupled to the plate of the normally-off tube 52 of the start-stop multivibrator through small condenser 53. The plate of tube 52 is fed from B+ through resistor 54, while the cathode is connected to ground through potentiometer 55. The grid of tube 52 is connected to the plate of tube 48 through the parallel combination of condenser 56 and resistor 57. The grid of tube 52 is connected to a negative voltage, as noted.

Referring now to the operation of the first circuit, and to Fig. 1 and Fig. 2, it is seen that as the antenna 10 rotates, the D.-C. voltage on the grid of tube 13 will vary. Let the antenna be rotating in such a manner that the potential of the center arm of potentiometer 11 is falling, thus causing the voltage on the grid of tube 13 to be decreasing, as shown in Fig. 2A. Since the cathode potential of this tube is held constant, the plate will be increasing in potential as shown at Fig. 2B, to the left of point 36. During this time, one side of neon tube 18 is at a negative potential, since tube 17 is not conducting, and the other side is at the potential of point 15. The voltage across the neon tube 18 is therefore increasing. When the voltage across tube 18 reaches the breakdown voltage, this tube will conduct with a comparatively low voltage across it, according to the curve shown in Fig. 2C. This will cause the voltage at point 15 to fall, as shown at point 36, Fig. 2B. This will bring the grid of tube 17 to a positive potential, as shown at point 37, Fig. 2C, and tube 17 will start conducting. This will cause current to flow in resistors 20 and 21 and to cause enough voltage drop across them to fire neon tubes 22 and 23. The conducting of tubes 22 and 23, which occurs substantially at the same time tube 17 starts conducting, causes point 24 to fall in potential as shown at 30, Fig. 2D. This abrupt fall in potential is differentiated by the network consisting of condenser 25 and resistor 26 and so a sharp pulse with a sloping trailing edge appears across resistor 26, as shown at 31, Fig. 2E. This pulse is applied to the cathode of cathode ray tube 27, thus increasing the brightness of the trace on the screen for the period of time at which the pulse occurs.

The function of potentiometer 14 in Fig. 1 is to vary the angle of the antenna at which the marker trace appears. It does this by varying the plate potential of tube 13 for any given value of potential on the grid of tube 13, and thus varies the potential used to fire gas tube 18. Potentiometer 14 may, if desired, readily be remotely located.

Referring now to the description of the second circuit and to Figs. 3 and 4, let us consider the antenna 40 rotating in such a manner that the potential of the center arm of potentiometer 41 is decreasing, and thus causing the grid voltage of tube 42 to be decreasing. This is shown at Fig. 4A. Since the cathode of tube 42 is held at a constant D.-C. potential, the plate 45 of this tube will increase in potential as shown in Fig. 4B, to the left of point 60. It can be seen that this will continually increase the voltage across neon tube 47. When the firing potential of tube 47 is reached, and this tube conducts, a low voltage will be placed across tube 42 and point 45 will decrease in potential as shown at 60, Fig. 4B. This sharp fall in potential will be differentiated by the network consisting of condenser 49 and resistor 50, and the pulse resulting will be applied to the grid of tube 48, turning this tube off. This waveform at this point is shown in Fig. 4C. Due to conventional multivibrator action, tube 52 will start to conduct, increasing suddenly the voltage at point 58. When the grid of tube 48 reaches cutoff and this tube starts conducting, tube 52 is shut off. The output wave-form is shown in Fig. 4D. Since the output is a positive-going pulse, it will be applied to the grid of the cathode ray tube to intensify the trace during the time the pulse is on. It is to be understood that any type of gas-filled tube may be used in these circuits, if the break-down characteristics are desirable.

The function of potentiometer 44 in Fig. 3 is to vary the angle of the antenna at which the marker trace appears. It does this by varying the plate potential of tube 42 for any given value of grid potential, and thus varies the potential used to fire gas tube 47. In both the circuit of Fig. 1 and that of Fig. 3, the input potentiometers could feed into a start-stop multivibrator which would then form a pulse at a critical antenna angle, performing the same function as the gas tubes shown.

The circuit of Fig. 1 produces a pulse which has a sloping trailing edge and so the marker trace on the screen of the cathode ray tube is bright at first and gets very dim at the end of the marker line. The pulse output of the circuit of Fig. 3 has a constant amplitude over the period of the pulse, and so the marker trace has constant brightness over its entire length.

In both the circuit of Fig. 1 and that of Fig. 3 the voltage which is used for triggering the angle marker, which comes from the antenna potentiometers, is preferably the same voltage which controls the sweep. This will guarantee that the marker will stay fixed at the selected portion of the scan. The cathode ray tube sweep then will rotate in synchronism with antenna 10, and whenever the antenna turns past a given point the sweep at that point will be brightened and a marker created.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electrical marker generator circuit for a cathode ray tube, comprising rotating antenna means; control voltage generator means coupled to said antenna means, for generating a voltage that varies linearly in amplitude with the angular position of said rotating antenna means; pulse forming means coupled to said generator means; means connected to said pulse forming means for preventing its operation until said voltage generator means produces a voltage equal to a given potential level above a given reference potential level; and means for coupling the output of said pulse forming means to said cathode ray tube, whereby an angular position marker pulse for said cathode ray tube is produced.

2. An electrical marker generator circuit as set forth in claim 1, wherein said pulse forming means includes a vacuum tube having an anode, a cathode, and at least one control grid which is coupled to the output of said control voltage generator means.

3. An electrical marker generator circuit as set forth in claim 2, wherein said means for preventing the operation of said pulse forming means comprises bias means connected to the cathode of said vacuum tube for cutting off said vacuum tube.

4. An electrical marker generator circuit as set forth in claim 3, wherein said bias means for cutting off said vacuum tube is variable and varies the potential level required to trigger said vacuum tube.

5. An electrical marker generator circuit as set forth in claim 4, wherein said variable cut off bias means comprises a potentiometer which has one end at said reference potential; a source of potential that is positive relative to said given reference potential and is coupled to the other end of said potentiometer, the movable arm of said potentiometer being connected to the cathode of said vacuum tube, whereby the bias on said vacuum tube can be varied.

6. An electrical marker generator circuit as set forth in claim 5, wherein said pulse forming means also includes gas discharge tube means coupled to the anode of said vacuum tube; and differentiation means coupled to said gas discharge tube means, for producing a sharp pulse to be applied to at least one of the electrodes of said cathode ray tube.

7. An electrical marker generator circuit for a cathode ray tube, comprising rotating antenna means; control voltage generator means coupled to said antenna means, for generating a voltage that varies linearly in amplitude with the angular position of said rotating antenna means, said generator means comprising a potentiometer having one end at a reference potential, a potential source that is positive with respect to said reference potential and is connected to the other end of said potentiometer, the movable arm of said potentiometer being coupled to said rotating antenna means; pulse-forming means including a vacuum tube having an anode, a cathode, and at least one control grid which is electrically coupled to said potentiometer arm; variable bias means coupled to said vacuum tube for setting a potential to be applied to said vacuum tube, and serving to fix the level of voltage output from said voltage generator means which will cause said vacuum tube to conduct, whereby a marker pulse to be applied to at least one of the electrodes of said cathode ray tube is produced.

8. An electrical marker generator circuit as set forth in claim 7, wherein said variable bias means includes a second potentiometer connected between said reference potential and said source of positive potential, the movable arm of said second potentiometer being connected to the cathode of said tube.

9. An electrical marker generator circuit as set forth in claim 8, wherein said pulse forming means also includes gas discharge tube means coupled to the anode of said vacuum tube, and differentiation means coupled to said gas discharge tube means, for producing a sharp pulse to be applied to at least one of the electrodes of said cathode ray tube.

10. An electrical marker generator circuit for a cathode ray tube, comprising rotating antenna means; control voltage generator means coupled to said antenna means, for generating a voltage that varies linearly in amplitude with the angular position of said rotating antenna means, said generator means comprising a first potentiometer having one end at a reference potential, a potential source that is positive with respect to said reference potential and is connected to the other end of said first potentiometer, the movable arm of said first potentiometer being coupled to said rotating antenna means; pulse forming means including a vacuum tube having an anode, a cathode, and at least one control grid which is electrically coupled to said first potentiometer arm; variable bias means coupled to said vacuum tube, for setting a potential to be applied to said vacuum tube and serving to fix the level of voltage output from said voltage generator which will cause said vacuum tube to conduct, said variable bias means comprising a second potentiometer connected between said reference potential and said source of positive potential, the movable arm of said second potentiometer being connected to the cathode of said tube; gas discharge tube means coupled to the anode of said vacuum tube; and differentiation means coupled to said gas discharge tube means, for producing a sharp output pulse of electrical energy.

11. An electrical marker generator circuit as set forth in claim 10, and also including a circuit connected between said gas discharge tube means and said differentiation means, said circuit comprising a second vacuum tube having a cathode, anode, and at least one control grid; a second source of positive potential; a load coupled between the anode of said second vacuum tube and said second source of positive potential, said load comprising two parallel circuits connected in series, each of said parallel circuits including a resistor and a gas discharge tube in parallel, the grid of said second vacuum tube being coupled through said first mentioned gas discharge tube to the anode of said first mentioned vacuum tube; means for biasing the grid of said second vacuum tube negatively with respect to said reference potential so as to maintain said second vacuum tube normally non-conducting, the output appearing across said load being coupled to said differentiation means.

12. An electrical marker generator circuit as set forth in claim 10, and including a one shot multivibrator coupled to said differentiation means, whereby said multivibrator is triggered by said sharp output pulse and produces a square wave output pulse to be applied to at least one of the electrodes of said cathode ray tube.

LAWRENCE H. JOHNSTON.

REFERENCES CITED

The following references are of record in the file of this patent:

UNITED STATES PATENTS

| Number | Name | Date |
|---|---|---|
| 2,092,081 | McLennan | Sept. 7, 1937 |
| 2,121,359 | Luck et al. | June 21, 1938 |
| 2,234,830 | Norton | Mar. 11, 1941 |
| 2,350,069 | Schrader et al. | May 30, 1944 |
| 2,369,631 | Zanarini | Feb. 13, 1945 |
| 2,406,858 | Shepherd et al. | Sept. 3, 1946 |